United States Patent [19]

Kalinowski et al.

[11] Patent Number: 4,732,879

[45] Date of Patent: Mar. 22, 1988

[54] METHOD FOR APPLYING POROUS, METAL OXIDE COATINGS TO RELATIVELY NONPOROUS FIBROUS SUBSTRATES

[75] Inventors: Marie R. Kalinowski, Granville; Gary M. Nishioka, Pataskala, both of Ohio

[73] Assignee: Owens-Corning Fiberglas Corporation, Toledo, Ohio

[21] Appl. No.: 796,137

[22] Filed: Nov. 8, 1985

[51] Int. Cl.$^4$ .................. B01J 37/34; B01J 35/06; B01J 21/06; B01J 21/02

[52] U.S. Cl. ........................ 502/5; 423/215.5; 423/439; 428/388; 428/389; 428/432; 502/171; 502/202; 502/242; 502/247; 502/304; 502/353; 502/527

[58] Field of Search ............... 502/242, 527, 2.5, 202, 502/238, 239, 247, 158, 171; 428/388, 389, 432

[56] References Cited

U.S. PATENT DOCUMENTS

| | | | |
|---|---|---|---|
| 3,189,563 | 1/1965 | Hauel | 502/527 |
| 3,323,889 | 6/1967 | Carl et al. | 65/60 |
| 3,562,185 | 2/1971 | Friedrichsen et al. | 502/242 |
| 3,873,469 | 3/1975 | Foster et al. | 502/242 |
| 3,929,671 | 12/1975 | Nakamura et al. | 502/242 |
| 3,949,109 | 4/1976 | McBride | 428/36 |
| 4,038,214 | 7/1977 | Gotoh et al. | 502/527 |
| 4,044,102 | 8/1977 | Muraki et al. | 423/309 |
| 4,200,609 | 4/1980 | Byrd | 422/177 |
| 4,220,633 | 9/1980 | Pirsh | 520/527 |
| 4,271,210 | 6/1981 | Yoldas | 65/184 |
| 4,303,554 | 12/1981 | Sudo et al. | 427/126.3 |
| 4,309,386 | 1/1982 | Pirsh | 422/177 |
| 4,376,803 | 3/1983 | Katzman | 428/389 |
| 4,376,804 | 3/1983 | Katzman | 428/389 |
| 4,397,666 | 8/1983 | Mishima et al. | 422/177 |
| 4,400,306 | 8/1983 | Dria et al. | 502/202 |
| 4,405,505 | 9/1983 | Neri et al. | 502/527 |
| 4,642,302 | 2/1987 | Wood et al. | 502/242 |

FOREIGN PATENT DOCUMENTS

| | | | |
|---|---|---|---|
| 93922 | 8/1976 | Japan. | |
| 134645 | 10/1980 | Japan | 502/521 |
| 73054 | 4/1984 | Japan | 502/242 |

OTHER PUBLICATIONS

Dislich et al., "Amorphous and Crystalline Dip Coatings Obtained from Organometallic Solutions: Procedures, Chemical Processes and Products", *Thin Solid Films*, vol. 77, No. 129 (1981).

Kiovski et al., "Evaluation of a New Zeolitic Catalyst for $NO_x$ Reduction with $NH_3$", *American Chemical Society*, 1980.

Nicholas et al., "Oxidation of an Automobile Exhaust Gas Mixture by Fiber Catalysts", *Ind. Eng. Chem., Prod. Res. Dev.*, vol. 15, No. 1, pp. 29–34 (1976).

Nicholas et al., "Carbon Monoxide Oxidation over a Platinum–Porous Fiber Glass Supported Catalyst", *Ind. Eng. Chem. Prod. Res. Dev.*, vol. 15, No. 1, pp. 35–40 (1976).

Schleppy et al., "Reduction of Nitric Oxide on Fiber Glass", *Ind. Eng. Chem., Prod. Res. Dev.*, vol. 15, No. 3, pp. 172–176 (1976).

Klein, "Sol-Gel Glass Technology—A Review", *The Glass Industry*, pp. 14–17, Jan. 1981.

*Primary Examiner*—Paul E. Konopka
*Attorney, Agent, or Firm*—Robert F. Rywalski; Donald J. Bird; Patrick P. Pacella

[57] ABSTRACT

A method for applying porous, preferably catalytically active metal oxide coatings to relatively non-porous substrates in a fibrous form, and the catalyst materials thereby obtained. A solution is formed of one or more hydrolyzable precursors of metal oxides, in an anhydrous, organic solvent. The substrate to be coated, having active surface hydroxyl groups and preferably being glass or ceramic, is dipped into the solution and thereafter removed, drained and dried in an atmosphere containing water vapor so as to form a uniform, and at least partially hydrolyzed metal hydroxide/alkoxide coating on the substrate. The thus coated substrate is cured by heating in one or more stages at temperatures in the range of between about 250° and 500° C. to form an adherent, highly porous coating of the corresponding metal oxide. The coated fibrous element so obtained is ideally suited for use in catalytically active filter elements for the simultaneous removal of particulates and noxious gaseous components from flue gases.

15 Claims, 8 Drawing Figures

METHOD FOR APPLYING POROUS, METAL OXIDE COATINGS TO RELATIVELY NONPOROUS FIBROUS SUBSTRATES

TECHNICAL FIELD

The present invention relates to a novel and improved method for applying a porous, preferably catalytically active metal oxide coating onto a non-porous substrate, and in particular to the preparation of a catalyst comprised of a fibrous substrate, preferably of glass or ceramic fibers, coated with one or more uniform, tightly adherent, durable and highly porous layers of one or more metal oxides. The invention moreover relates to the use of such coated fibrous substrates in the form of woven fabric for making catlytic filter bags for the simultaneous removal of particulates and noxious compounds, such as $NO_x$, from combustion gases.

BACKGROUND ART

It is known to use glass or metal fibers, as a mesh, woven cloth or wool, as a catalyst support. The catalyst is conventionally applied to the support by simply impregnating it with a solution of the catalytically active material, or a precursor thereof, followed by drying and/or activation by calcining. For instance, in U.S. Pat. No. 4,200,609, a catalyst impregnated fiber mesh (made from, for instance, a glass fiber substrate) is prepared by contacting the substrate with a solution of permanganate in water, and the resulting catalytic structure is used in the form of conical fibric bags or filter panels placed in air ducts for the removal of ozone, for instance from the air supply to aircraft cabins.

A high temperature catalyst system particularly adapted for a catalytic converter is proposed in U.S. PAT. No. 3,189,563 wherein the catalyst is formed on a glass fabric carrier. An open mesh glass fabric supported catalyst is prepared by applying a fluid dispersion or slurry of refractory ceramic precursors to a glass fabric, which is thereafter calcined to convert the coating to the refractory material. At the high temperatures employed, the hardened refractory mass essentially becomes the support in place of the glass fibers, and preserves the original open mesh design of the fabric. The calcined structure preserves the original open mesh design of the fabric. The calcined product is described as a large pore carrier of refractory material, having a skeleton of more or less disintegrated threads, which may be coated or impregnated with the catalytic materials by conventional methods. The refractory materials thus prepared are said to resist heat shock very well, but the flexibility of the glass fiber is lost, and the fibers are easily broken by mechanical or physical shock.

To overcome the brittleness experienced with the ceramic support of the above '563 patent, U.S. Pat. No. 4,038,214 proposes using a woven high silica glass fiber, rather than ceramic coatings, to obtain greater strength and heat resistance. The woven glass fiber is impregnated with a solution of the catalyst by conventional techniques, and activated by calcining at a high temperature.

It is also known that cloth or fibers which have been treated to be chemically, physically or chemical-physically active can be used in filter bags for the simultaneous removal of particulates and noxious gases from gas streams such as flue gas. For instance, it has been proposed in U.S. Pat. Nos. 4,220,633 and 4,309,386 to use catalytic filter bags made of a glass, metal, refractory or ceramic fabric in a filter house structure to simultaneously remove entrained particulates and nitrogen oxides from flue gases. The $NO_x$ removal is accomplished by injecting ammonia into the flue gas and passing it through filter bags in which an appropriate catalyst has been incorporated, for instance as drawn filaments interspersed with the filter fabric fibers. Alternatively, it is suggested that the filter bags may be coated with the catalyst by spraying the fibers with a suspension of finely divided catalyst, or with a solution of the appropriate metal catalyst salts which may be subsequently converted to the desired oxide form, or by applying a finely divided catalyst to the filter bags as a pre-coat prior to placing them in service.

Although a glass fiber cloth or mesh substrate already provides a somewhat enhanced surface area relative to a solid or sheet material, such substrates coated with catalytic materials by conventional techniques still have only a limited catalytic activity, particularly at the higher space velocities encountered, for instance, in filter bag applications. Moreover, applications such as filter bags require that the catalytically active fabric material be not only self-supporting, but flexible and highly resistant to abrasion and/or self-abrasion, and capable of withstanding elevated temperatures. None of the above known materials or processes adequately satisfy this combination of requirements.

It has now been found that a highly porous, adherent and abrasion resistant coating of one or more catalytically active metal oxides may be applied to a fibrous substrate, while still maintaining flexiblity, by coating the substrate with a metal alkoxide precursor of the desired metal oxide, in accordance with an improved and particularly adapted sol-gel process.

The sol-gel process has typically been utilized in the past to produce extremely homogeneous, low temperature oxide glasses, starting with metal alkoxides. Most commonly, in the polymerization type of process, the metal alkoxides are reacted as a unit to form alkoxide complexes that are later subjected to controlled hydrolysis reactions. Thus, the metal alkoxides are dissolved in the desired proportions in an organic solvent, such as methanol or ethanol. If a less reactive alkoxide is used, such as silicon alkoxide, it may be desirable to reflux the solution for several hours under an inert atmosphere to promote the complex formation. The solution is then permitted to react with mosiure present in the atmosphere, or added in controlled amounts, to promote the hydrolysis-condensation reactions. The hydrolysis reaction results in the replacement of organic groups by hydroxyl groups and, in the condensation reaction, hydroxyl groups condense by splitting off water, resulting in a network structure or gel. The gel thus formed, which consists of an open oxide network containing unreacted alkoxide groups, hydroxy groups, solvent, and reaction products, is dried and heated to temperatures of from about 250° C. to about 500° C. in order to remove residual organic and hydroxyl groups. The dried gels may then be further heated to a temperature sufficient to eliminate porosity and consolidate the structure.

In more recent years, techniques have been developed whereby the gel thus produced can be applied as a coating to substrates, particularly large panes of glass, to obtain desired optical properties. Thus, in a dip-coating procedure described H. Dislich and E. Hussmann, Thin Solid Films, Vol. 77, No. 129 (1981), large glass panes are carefully cleaned, dipped into a solution containing hydrolyzable metal compounds and then pulled out at a constant speed into an atmosphere containing water vapor. In this atmosphere, the hydrolysis and condensation reactions take place until transparent metal oxide layers are obtained. Finally, the film is hardened in a high temperature cycle until a transparent metal oxide film has been formed. Such sol gel coating techniques have heretofore been directed primarily toward applying optical coatings to planar surfaces such as glass plates or sheets.

SUMMARY OF THE INVENTION

It has now surprisingly been found that greatly enhanced catalytic activity can be obtained by applying one or more porous, metal oxide coatings onto fibrous substrates utilizing a variant of the sol gel process. In accordance with the present invention, a porous, adherent and abrasion resistant coating of one or more catalytically active metal oxides is formed on a fibrous substrate by coating such substrate with an anhydrous organic solvent solution of the metal alkoxide precursors of the desired metal oxide. The thus coated substrate is then exposed to water or a moisture-containing atmosphere under conditions and time suitable to at least partially hydrolyze the metal alkoxide to the corresponding metal hydroxide. For instance, after the substrate has been coated, it can be air dried for a few minutes.

As the solvent evaporates from the coated film, the following hydrolysis and condensation reaction takes place:

$$M(OR)_n + H_2O \rightarrow M(OR)_{n-1}OH + ROH$$
(hydrolysis)

$$M(OR)_x(OH)_y + H_2O \rightarrow M(OR)_{x-1}(OH)_{y+1} + ROH$$
(hydrolysis)

$$M(OR)_x(OH)_y + M'(OR)_w(OH)_z \rightarrow M(OR)_x(OH)_{y-1} - O - M'(OR)_w(OH)_{z-1} + H_2O \text{ (condensation)}$$

wherein M and M' represent metals capable for forming an alkoxide, and R represents any alkyl group. These reactions form a porous metal oxide network, liberating alcohol and water. After air drying, the coated substrate should be cured at a temperature of between about 250° C. and 500° C. to drive off residual organic matter, leaving a porous oxide coating on the surface. The coating is strongly bound to the surface of the substrate because of condensation of the alkoxides and hydroxides not only with themselves, but with the surface hydroxyl groups, to form covalent bonds.

In a preferred embodiment of the invention, glass, glass-ceramic or ceramic fibers are dipped into an anhydrous, organic solvent coating solution of one or more metal alkoxides and dried in a moisture containing atmosphere so as to at least partially hydrolyze the alkoxide to the corresponding metal hydroxide. The thus dried and partially hydrolyzed coated substrate is then cured in a microwave oven and/or in a conventional thermal oven so as to substantially complete the hydrolysis, drive out the remaining organic constituents, and convert the metal hydroxide to a highly porous metal oxide structure.

In a further preferred embodiment, particularly applicable with the more reactive metal alkoxides such as titanium alkoxides, the use of diacetone alcohol as the solvent for the coating solution has been found to minimize any hydrolysis prior to application of the coating to the fibrous substrate, permitting application of a more uniform coating, and the preparation of higher concentration alkoxide coating solutions having a longer pot life.

In yet a further preferred embodiment, resistance to self-abrasion is greatly enhanced by building up the coating by the sequential application of multiple thin layers from a relatively dilute metal alkoxide coating solution, with curing of each layer before application of the next.

According to another feature of the invention, further enhanced porosity of the coating can be achieved by first applying to the substrate and curing a relatively dilute solution of an alkoxide precursor of one of the more refractory oxides, such as titanium, zirconium or aluminum oxides, and subsequently applying and curing an overcoating of the desired catalytically active oxide.

According to yet another feature of the invention, still further enhanced porosity of the coating, and thus increased catalytic activity, can be surprisingly achieved by the sequence of first curing the coated substrate in a microwave oven, and subsequently subjecting it to a thermal cure such as by heating in a conventional oven.

Although the coated, fibrous substrates of the present invention have many potential applications where the obtained abrasion and heat resistance, durability, flexibility and enhanced porosity and catalytic activity can be of great advantage, they are particularly suitable for application as catalytically active filter bags in filter house installations for the removal of $NO_x$ and/or other noxious gases, together with simultaneous removal of particulates, from combustion flue gas streams. The present invention satisfies a need in the art by providing a catalytically active filter bag having the properties needed for satisfactory operation of such installations.

DESCRIPTION OF THE PREFERRED EMBODIMENTS

The present invention is particularly suitable and adapted for the provision of catalytic coatings on fibrous materials, and the following discussion will be primarily directed thereto. However, it should be recognized that many of the improved coating techniques of this invention may advantageously be utilized in the coating of other substrates, such as plate glass or other shaped articles.

The fibrous substrates coated in accordance with the present invention may be metal, glass or ceramic, provided that surface hydroxyl groups are available to promote adhesion by reaction with the metal alkoxide/hydroxide coating. Unless otherwise indicated, the term "glass" includes glass-ceramic formulations as well as fibers made from minerals, such as rock. Preferably, glass fibers are used, which may be one of many formulations. Desirably, the glass will be an alkaline earth alumino-silicate, most preferably S-type glass fibers. Typically, an S-type glass has the following approximate composition by weight (excluding impurities):

$SiO_2$: 55–80%
$Al_2O_3$: 12–32%
$MgO$: 4–20%

For many applications, alkaline earth boro-alumino silicate compositions, for example, E-glass compositions, will be desirable.

Prior to coating in accordance with this invention, the surface of the substrate should be free of any surface contaminants. If the glass fiber or cloth has been sized, it should be heat cleaned at a temperature of at least about 250° C. to remove surface contaminants. An example of a preferred heat cleaning schedule consists of 15 seconds of heating at 525° C. by a gas flame in a caramelizing oven, followed by batch cleaning in a gas fired hot air oven, in which the glass material is first maintained for 3 hours at 80° C., then heated to 245° C. in 6 hours and held at that temperature for 12 hours, then heated to 345° C. in 3 hours and held for 33 hours, and finally cooled to ambient temperature in 2 hours.

The fibrous substrate may, at the time of coating, be in the form of individual filaments, strands, or bundles of individual filaments, matts, batts, and may be in the form of a woven or nonwoven cloth or fabric. Preferably, and particularly when intended for use in catalytically active filter bags, the substrate will be in the form of a closely woven glass or ceramic cloth of a weave sufficient to trap the desired quantity of particulates. However, a more open weave or mesh, or non-woven structure, may be more suitable for other catalytic applications where the simultaneous removal of particulates is not a factor.

The organometallic precursor of the desired metal oxide broadly may include any compound containing at least one group bonded to the metal which is readily hydrolyzable under the conditions disclosed herein, provided there is at least one compound containing two or more hydrolyzable groups also present to set up a network. Preferably, the organometallic precursor will be a corresponding metal alkoxide having the formula $M(OR)_n$ or $MO_m(OR)_n$, wherein R is an organic group such that ROH would be an alcohol wherein m and n are integers which vary depending on the valence of the metal M. Preferably, however, R will be an alkyl, and most preferably the alkoxide group will be a methoxide, ethoxide, propoxide, or butoxide group. A correlation has been found between pore size and the length of the alkoxy group. Thus, metal alkoxide coatings formed from methoxides have the smallest pores, and butoxides yield coatings with relatively larger pores.

M may be a metal capable of forming a hydrolyzable alkoxide, but for catalytic applications, M will be one or more metals selected from the group consisting of V, Ni, Mo, Mn, Cr, Fe, Ce, W, and Cu. Where the catalytically coated substrate is to be used for the selective catalytic reduction of $NO_x$ in combustion flue gases and the like in the presence of ammonia, M will most preferably be one or more metals selected from the group consisting of V, Fe, Ce, W, and Cu. The coating solution may additionally contain metal alkoxide precursors of metal oxides which may function as catalyst promoters, such as alkoxides of titanium, tin, and antimony. It may also be advantageous, as will be explained in more detail below, to include metal alkoxide precursors or metal oxides which may not in themselves be particularly catalytically active, but which serve to increase the porosity of the resultant coated substrate, and thus increase the surface area and activity of the catalyst layer. These would include metal alkoxide precursors of oxides of zirconium, silicon, and aluminum.

It has been found that a most suitable catalytic coating for bag filters used in the selective catalytic reduction of $NO_x$ in the presence of ammonia will contain a mixture of vanadium and titanium oxides in V:Ti atomic ratios of between about 1:9 to 9:1, more preferably between about 1:2 and 2:1. A coating including vanadium and titanium oxides in an atomic ratio of V:Ti of between about 2:3 to 3:2 has been found to be outstandingly adapted for use in catalytically active filter cloth for use in $NO_x$ reduction.

The solvent of the coating solution containing the catalytically active metal oxide precursor compound may be any of a number of organic compounds heretofore disclosed in conjunction with sol-gel techniques in which the corresponding metal alkoxide is soluble. Relatively inexpensive alcohols, such as methanol, ethanol, propanol, and butanol are typically used. However, it has been found essential in order to obtain a stable alkoxide solution, i.e., a clear, substantially unhydrolyzed solution, and to obtain a uniform coating, that the coating solution be substantially anhydrous so as to minimize hydrolysis prior to application of the coating solution to the substrate. This is of particular importance with the more reactive alkoxides, such as alkoxides of titanium, aluminum, and zirconium. Toward this end it is preferable, and especially with the more reactive metal oxides are being applied, that the solvent be predried, such as by contacting it with molecular sieve prior to forming the metal alkoxide solution. Once the coating solution has been applied to the substrate, it is desirable for the hydrolysis reaction to take place as quickly as possible. For this reason, it is preferable that the solvent also be able to dissolve water from the atmosphere in order to initiate and effect this hydrolysis.

It has surprisingly been found that diacetone alcohol is a particularly effective solvent in minimizing premature hydrolysis of even the most reactive alkoxides while still in solution. Thus, whereas stable coating solutions of titanium alkoxide in concentrations in excess of about 0.5 molar could not be made in conventional alcohols such as ethanol or isopropanol, it has been found that titanium alkoxide solutions having concentrations well in excess of 1.0 M can be formed with diacetone alcohol, even without predrying the alcohol. It is preferable, however, to predry even the diacetone alcohol.

Metal alkoxide solution concentrations in the range of between about 0.05 and 2 molar may be used. Metal alkoxide solution concentrations of between about 0.5 and 2 molar have been found particularly suitable for single coating applications. Depending upon the particular alkoxide, its concentration, and other conditions of the coating solution and precedure used, this will result in metal oxide coatings on the fibers having a thickness in the range of between about 0.02 and 0.08 mils. As will be discussed in greater detail below, applicant has found that resistance of the resultant coated substrate to self-abrasion can be significantly enhanced by successively applying and curing multiple coats of more dilute alkoxide solutions. The alkoxide concentration of the coating solutions used for the application of multiple coats will generally be less than the concentration of coating solutions used in single coating applications and will preferably be in the range of between about 0.05 and 0.2 molar. Where the coating solution contains a mixture of two or more metal alkoxides, the concentration referred to above is the total concentration of all metal alkoxides. In the multiple coat embodiment of the invention, the fiber substrate is dipped in the dilute alkoxide coating solution, dried and at least partially cured prior to application of each successive coating by the same procedure. Each metal oxide coating will generally have a thickness of less than about 0.08 mils, and preferably the total thickness of all applied metal oxide coatings combined will be in the range of between about 0.02 and 0.08 mils.

The metal alkoxide coating is preferably applied to the substrate by emersing it into the coating solution for a sufficient time to permit the solution to penetrate throughout the substrate, i.e., impregnate substantially the entire surface area of all the monofilaments comprising a bundle or strand of fibers. The impregnated and coated substrate is then withdrawn, preferably at a substantially constant rate so as to leave a coating of uniform thickness. However, any technique that applies a uniform coating over all of the fibers of the substrate, while preventing hydrolysis from occuring until after the coating has been applied, should be sufficient for purposes of this invention. For instance, fabric coating techniques such as a "kiss roll", "reverse roll", or "squeeze roll" can be employed.

After the coating has been applied, the hydrolysis and polymerization reactions are initiated, preferably by drying the coated substrate in a moisture containing atmosphere. It is generally sufficient to dry the coated substrate under ambient room conditions of temperature and humidity for a period of between about 10 minutes and 4 hours.

The partially polymerized and hydrolyzed coating thus formed is then cured by controlled heating at a temperature of at least about 250° C. but no higher than about 500° C. At lower temperatures the removal of the organic constituents will not occur, and at higher temperatures approaching 500° C. and above, the cell structure of the gel will break down, and the porosity of the resultant catalytic coating will be reduced. The maximum acceptable temperature for curing depends on the composition of the oxide coating. The more refractory the oxide coating the higher the maximum curing temperature. For example, a vanadium oxide/titanium oxide coating containing a vanadium to titanium atomic ratio of 5:95 can withstand a cure temperature of 425° C. with no apparent loss in catalytic activity. On the other hand, a vanadium oxide/titanium oxide coating containing a vanadium to titanium ratio of 25:75 will have a substantially loss of catalytic activity when cured at 425° C., and preferably should be cured at a temperature no higher than about 375° C. This same maximum temperature limitation likewise should not be exceeded in use. Preferably, the coated substrate will be cured at a temperature in the range of between about 300° and 450° C., and most preferably between about 350° and 400° C. Although not necessary to the successful practice of the invention, it may be preferably to carry out the cure in an oxidizing atmosphere to provide more complete removal of organic constituents and carbon residues.

Where the coated substrate is ultimately to be used in an environment having a temperature within the above ranges, all or a portion of the thermal cure may be effected during actual use.

In a further preferred embodiment of this invention, it has been found that particularly high porosity coatings can be obtained by using a two-stage cure, the first cure being carried out in a microwave oven, and the second, thermal cure being carried out in a conventional oven. It is theorized that the initial microwave cure provides a uniform and gentle heating which drives the condensation reaction forward sufficiently to set up a stable gel structure in the coating which will not sinter at the temperatures of the thermal cure. The subsequent thermal cure substantially completes that reaction, and drives out essentially all of the remaining organic constituents to produce a porous coating without sintering.

The first stage microwave cure may suitably be carried out at a power setting of about 500 to 1000 watts for a period of at least about one minute, and preferably for at least about 10 minutes. This is followed by a second thermal cure in a conventional oven at a temperature of between 250° C. and 500° C., preferably at a temperature in the range of between about 350° and 400° C. for a period of between about 10 minutes to 4 hours.

Catalytic filter bags must have the mechanical properties necessary to withstand the periodic cleaning cycles that filter bags undergo. In particular, when fibers in the form of a woven cloth are subjected to continuous flexing, as would be the case with a filter bag, they are subject to self-abrasion, that is, abrasion between adjacent identical fibers. Untreated glass fibers generally do not have sufficient resistance to self-abrasion to provide long service under the severe flexing conditions encountered in filter bag installations, particularly the pulsations or shaking used to dislodge the trapped particulates during the cleaning cycle.

Conventional filter bags operate at between about 120° C. and 250° C. and can be protected from self-abrasion by organic coatings, such as perfluoroethylene. Since a catalytic filter bag needs to operate at substantially higher temperatures, generally in excess of 350° C., conventional organic coatings are not effective. For these higher temperature applications, filter fabric made of relatively expensive, commercially available ceramic fiber has been demonstrated to have a significantly higher abrasion resistance than untreated glass, and has, until now, become more or less the standard in the filter bag industry for high temperature service, e.g., over 300° C., as might be encountered in the filtration of particles from combustion flue gases.

It is generally not possible to predict whether an increase in the hardness of the fibers involved will have a positive or negative effect on self-abrasion. However, it has now been found that woven cloth having a metal oxide coating in accordance with the present invention has an abrasion resistance nearly five times greater than cloth woven from glass fiber alone. Even more surprising, however, is that when the catalytically active coating on the woven glass fiber is built up from multiple thin metal oxide layers in accordance with a preferred embodiment of the invention, then a still further improved abrasion resistance can be realized. For example, S-type glass cloth coated successively with dilute (0.1 M) metal alkoxide solutions, and cured between each coating step, showed additional improvement in flex lifetime with each successive coat/cure step. It appears that ten coat/cure cycles are more than sufficient to attain a flex life exceeding that of the commercially available ceramic fiber.

The effect of applying successive coatings of a silicon oxide‐zirconium oxide mixture on S-type glass is graphically shown in Example 7 wherein significant improvement in flex life is obtained with, for instance, five coats and the flex life with ten coats is nearly 150 cycles to fail. This compares with 108 cycles for ceramic cloth and only 9 cycles to fail for heat cleaned S-type glass cloth having no finish. Similar flex life improvements are also realized with successive coatings of catalytic oxides. For instance, ten successive coatings of a vanadium oxide-titanium oxide mixture on heat cleaned S-type glass has given a flex life in the range of between about 110 and 170 cycles to fail, depending upon the method of cure, and even higher flex life can be obtained by the addition of further coatings.

In yet a further embodiment of the present invention, a very suitable filter bag cloth can be achieved, in accordance with another feature of this invention, by applying and curing, as described herein, at least one initial base coat of a relatively dilute solution of an alkoxide precursor of one or more refractory oxides, such as oxides of zirconium, titanium, and aluminum. Particularly suitable coatings have been made by successively applying a base coat of a silicon oxide-zirconium oxide mixture in a Si:Zr atomic ratio of between about 1:3 to 3:1, most preferably about 1:1, on S-type glass, to serve as a protective undercoat and also as a high surface area backbone, and then applying one or more catalytically active topcoats, such as a vanadium oxide-titanium oxide mixture to endow the cloth with catalytic properties.

The catalytically active coated fabric of this invention is very suitable for use in filter installations, such as bag filters, for treatment of flue gases to simultaneously remove particulates and noxious gases such as $SO_2$ and $NO_x$. In particular, the catalytically active fabric is ideally suited to installations wherein $NO_x$ is reduced by selective catalytic reduction (SCR). Selective catalytic reduction involves the reduction of nitrogen oxides by ammonia in the presence of a catalyst by the reactions:

$$6\ NO + 4\ NH_3 \rightarrow 5\ N_2 + 6\ H_2O$$

$$6\ NO_2 + 8\ NH_3 \rightarrow 7\ N_2 + 12\ H_2O$$

In a typical installation, the ammonia will be injected into the hot-particulate and $NO_x$-laden flue gas, and the resulting gas mixture passed through the catalytically active filter bags, preferably at a temperature in the range of between about 300° C. and 400° C. The particulates will be trapped in the filter bags, and the $NO_x$ catalytically reduced by the ammonia as it passes through the catalytically active fabric. The amount of ammonia required depends upon the $NO_x$ content of the flue gas as well as the $NO_x$ reduction efficiency of the particular catalyst being used. Literally thousands of catalysts have been tested for $NO_x$ control. See, for example, J. R. Kiovski, P. B. Koradia, and C. T. Lin, Ind. Eng. Chem. Prod. Res. Dev., 19, 218 (1980). However, for the high face velocities required in catalytically active filter bag installations, applicant has found vanadium oxide based catalytic coatings to be highly suitable because of their high efficiency at relatively low temperatures, and their resistance to $SO_2$ poisoning.

The catalytic activity of vanadium oxide is believed to be due to the presence of V=O groups on the surface, where the following reaction occurs:

$$NO + NH_3 + V=O \rightarrow V-OH + N_2 + H_2O$$

In the absence of oxygen, the catalytic activity of vanadium oxide will decay as the surface V=O groups are converted to V—OH. However, if oxygen is present, the surface regenerates:

$$4\ VOH + O_2 \rightarrow 4\ V=O + 2\ H_2O$$

Applicant has found vanadium oxide-titanium mixtures to be even more catalytically active than pure vanadium oxide. Titanium oxide is believed to somehow increase the surface density of V=O groups. Since titanium oxides by itself is not a catalyst, it is believed to be a promoter for the vanadium oxide.

As noted above, the face velocities encountered in the selective catalytic reduction of $NO_x$ on catalytically active filter bags is extremely high. The activity of filter bags is normalized by the face velocity, which is the flow rate of gas divided by the cross-sectional area of the fabric. A typical face velocity for filter bags is in the range of between about 1 and 3 feet per minute for reverse gas and shake-deflate designs, and between about 5 and 6 feet per minute for pulse jet designs.

By contrast, the activity of catalysts (such as in fixed or fluid beds) is normalized by a term called space velocity, which is the flow rate of gas or liquid flowing through the catalyst divided by the catalyst volume. Units of space velocity are generally reported in inverse hours, and a typical space velocity used in SCR processes are in the range of 3,000 to 10,000 hr.$^{-1}$.

For comparison, if a fabric is 1 millimeter thick, then a typical face velocity for filter bags of 3 feet or 1 meter per minute is equivalent to a space velocity of 60,000/hr. Therefore, a catalytic filter bag operating at normal face velocities must be from about 6 to 20 times more active than conventional catalysts which operate at 3,000 to 10,000/hour. Alternatively, the gas flow rate through a catalytically active filter bag must be only 1/6 to 1/20 of the typical bag filter flow rates for a cloth of equivalent catalytic activity equal to existing SCR catalysts. Accordingly, to be of practical commercial value in catalytically active filter bag installations for the selective catalytic reduction of $NO_x$, the catalytic coating on the filter fabric preferably will be capable of eliminating at least about 70 percent of the nitrogen oxides from the flue gas at face velocities of at least about 2 feet per minute.

INDUSTRIAL APPLICABILITY

The highly porous, catalytically active coated fibrous substrate of the invention is especially effective as a woven fabric for making catalytic bags for bag filter installations utilized for the simultaneous removal of particulates and noxious compounds from combustion flue gases. The invention will, therefore, be described in detail on the following examples with respect to features of this embodiment, in particular with respect to the catalytic reduction and removal of $NO_x$, it being understood, however, that the invention is not limited thereto.

EXAMPLE 1

The following samples demonstrate the deposition of metal oxide coatings on glass fabric by the basic method of this invention, and the relative increase in porosity thereby achieved.

SAMPLE A

An alkoxide solution was prepared by dissolving 52.08 g of silicon tetraethoxide (0.25 moles of Si-$(OC_2H_5)_4$) and 81.89 grams of zirconium tetrapropoxide (0.25 moles of $Zr(OC_3H_7)_4$) in dry diacetone alcohol to make one liter of coating solution. The diacetone alcohol was dried by immersing molecular sieve (Linde 5A) in it overnight, and removing the sieve by filtration prior to use.

Heat cleaned E-glass fabric was immersed in the solution for 10 seconds, removed, and allowed to air dry for 10 minutes. The fabric was then placed in an oven at 300° C. for four hours. The resulting fabric had an apparent surface area, as measured by the BET method, of 2.3 $M^2/g$. By comparison, bare cloth has a BET apparent surface area of 0.2 $M^2/g$.

SAMPLE B

An alkoxide solution was prepared by dissolving 31.25 g of silicon tetraethoxide (0.15 moles) and 49.13 g of zirconium tetrapropoxide (0.15 moles) in dry diacetone alcohol to make one liter. This solution is a less concentrated coating solution than the solution used in Sample A. Heat cleaned E-glass fabric was coated with this solution and cured by the same procedure used in Sample A. The apparent surface area of this sample was 1.3 $M^2/g$.

SAMPLE C

An alkoxide solution was prepared by dissolving 142.1 g of titanium i-propoxide (0.5 moles of Ti-$(OC_3H_7)_4$) in dry diacetone alcohol to make one liter of coating solution. Heat cleaned S-type glass fabric was coated and cured by the same procedure used in Sample A. The apparent surface area of this sample was 0.5 $M^2/g$.

SAMPLE D

An alkoxide solution was prepared by dissolving 83.3 g of silicon tetraethoxide (0.4 moles) in 4 liters of diacetone alcohol. Since silicon tetraethoxide does not hydrolyze readily, the diacetone alcohol need not be dried. To catalyze the hydrolysis of silicon tetraethoxide after application to the glass, 5 ml. of concentrated nitric acid ($HNO_3$) was first dissolved in the diacetone alcohol before addition of alkoxide. Twenty yards of fabric 13 in. wide was dip-coated in this solution at a belt speed of 9 ft/min. and a dwell time of 5 seconds. The fabric was air dried for 15 minutes and then was cured at 350° C. by pulling the fabric through a 12 foot oven at 1.5 ft/min.

EXAMPLE 2

Figure 1:
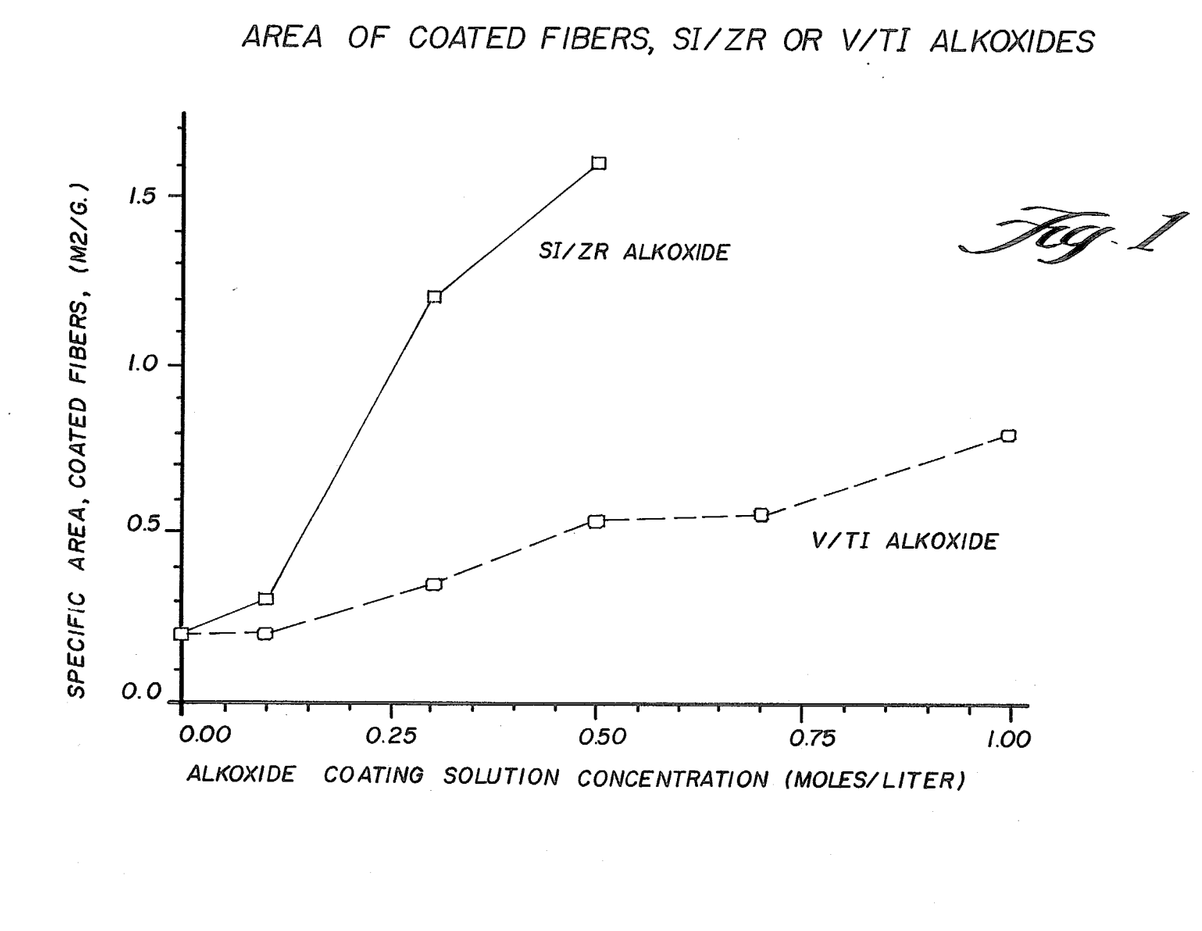
FIG. 1 plots the specific area of coated fibers as a function of the alkoxide concentration in the coating solution for two different alkoxide mixtures, as described in greater detail in Example 2 below.

Equimolar solutions of vanadyl n-butylate and titanium tetrapropoxide were prepared in diacetone alcohol at varying total alkoxide concentrations, and dip-coated onto a series of S-type glass cloths (33 oz/yd$^2$), dried, and cured at 375° C. for 4 hours. Similarly, equimolar solutions of silicon tetraethoxide and zirconium tetrapropoxide were prepared in diacetone alcohol at varying total alkoxide concentrations, and dip-coated onto a series of S-type glass cloths (33 oz/yd$^2$), dried, and cured at 375° C. for 4 hours. The resultant BET apparent surface area of each sample was measured, and plotted in FIG. 1 as a function of the total molar concentration of each respective coating solution. It is apparent from FIG. 1 that coatings formed from the Si/Zr alkoxide solutions at a given total molar concentration have a significantly higher BET apparent surface area as compared to coatings formed from V/Ti alkoxide solutions of like concentration. In both instances significant area increases occur above 0.10 M concentration.

EXAMPLE 3

Figure 2:
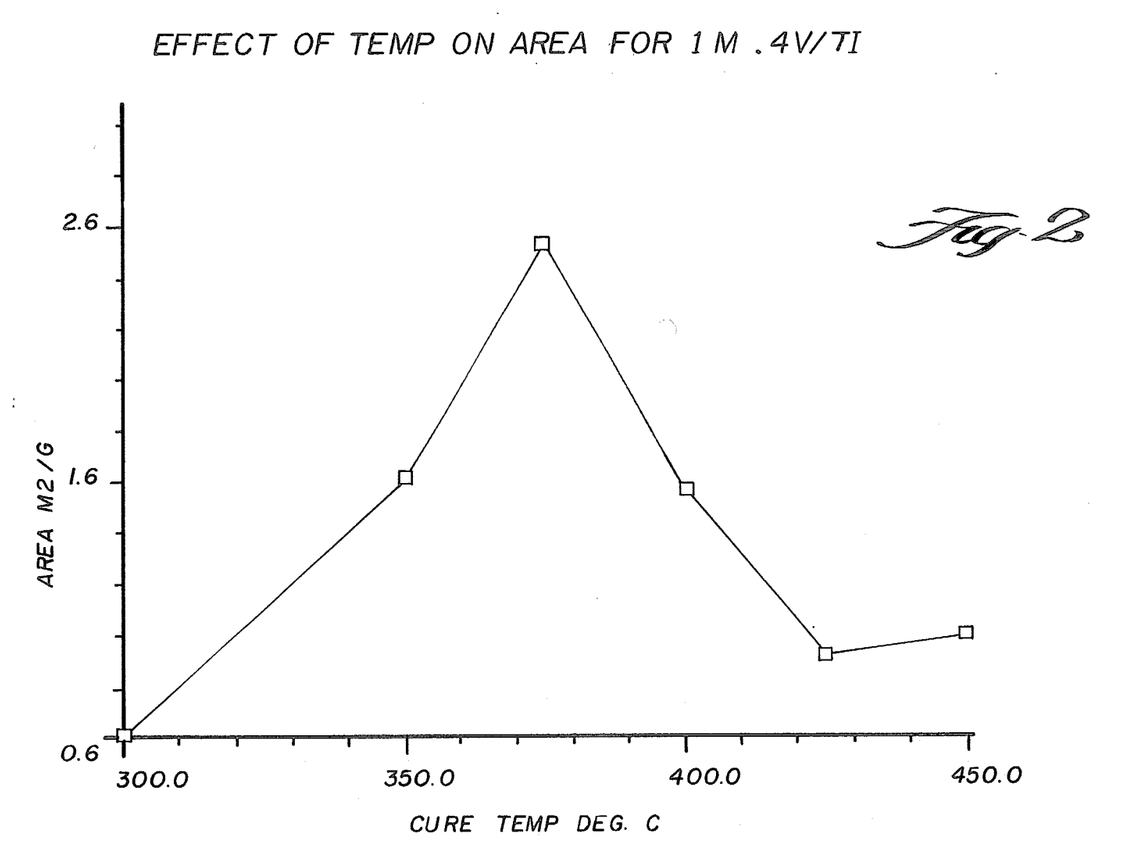
FIG. 2 illustrates the effect of the final cure temperature on the surface area of coated fibers, plotting surface area in square meters per gram as a function of the cure temperature. This is described in greater detail in Example 3 below.

In order to demonstrate the effect of the cure temperature on catalytic activity, glass cloth samples were coated with a 1 liter solution containing 0.4 moles of vanadyl n-butylate and 0.6 moles of titanium tetrapropoxide in diacetone alcohol. The thus-coated samples were air dried for approximately 10 minutes and cured at temperatures ranging between 300° and 450° C. in a conventional thermal oven for a period of 4 hours. The BET apparent surface area of each sample was determined and is plotted on FIG. 2 against the cure temperature. From this figure it is readily apparent that maximum porosity, and thus presumably catalytic activity, is obtained at cure temperatures in the range of between about 350° and 400° C., most preferably at a temperature of about 375° C.

EXAMPLE 4

A series of S-type glass cloth samples were coated with a one molar alkoxide coating solution containing a mixture of vanadyl n-butylate and titanium i-propoxide in varying relative concentrations in dry diacetone alcohol as follows:

| Sample | Vanadyl n-butylate (moles/liter) | titanium i-propoxide (moles/liter) |
| --- | --- | --- |
| A | 0.10 | 0.90 |
| B | 0.20 | 0.80 |
| C | 0.25 | 0.75 |
| D | 0.30 | 0.70 |
| E | 0.40 | 0.60 |
| F | 0.50 | 0.50 |
| G | 0.60 | 0.40 |
| H | 0.70 | 0.30 |
| I | 0.80 | 0.20 |
| J | 0.90 | 0.10 |

In each case the cloth was dip coated in the coating solution dried in air for approximately 60 minutes and cured in an oven at 375° C. for about 4 hours.

The catalytic activity of the cloths were tested using a laboratory reactor. A simulated flue gas mixture consisting of the following composition was used: 78% nitrogen, 6% oxygen, 16% carbon dioxide, 950 ppm nitric oxide. Ammonia was also present in the gas in an amount of 990 ppm.

The simulated flue gas plus ammonia was passed through a single thickness of coated cloth. The concentration of nitric oxide in the flue gas after passing through the catalytic cloth was measured by a chemiluminescent analyzer. The activity of the cloth was measured at different temperatures and different face velocities of gas through the cloth.

Figure 3:
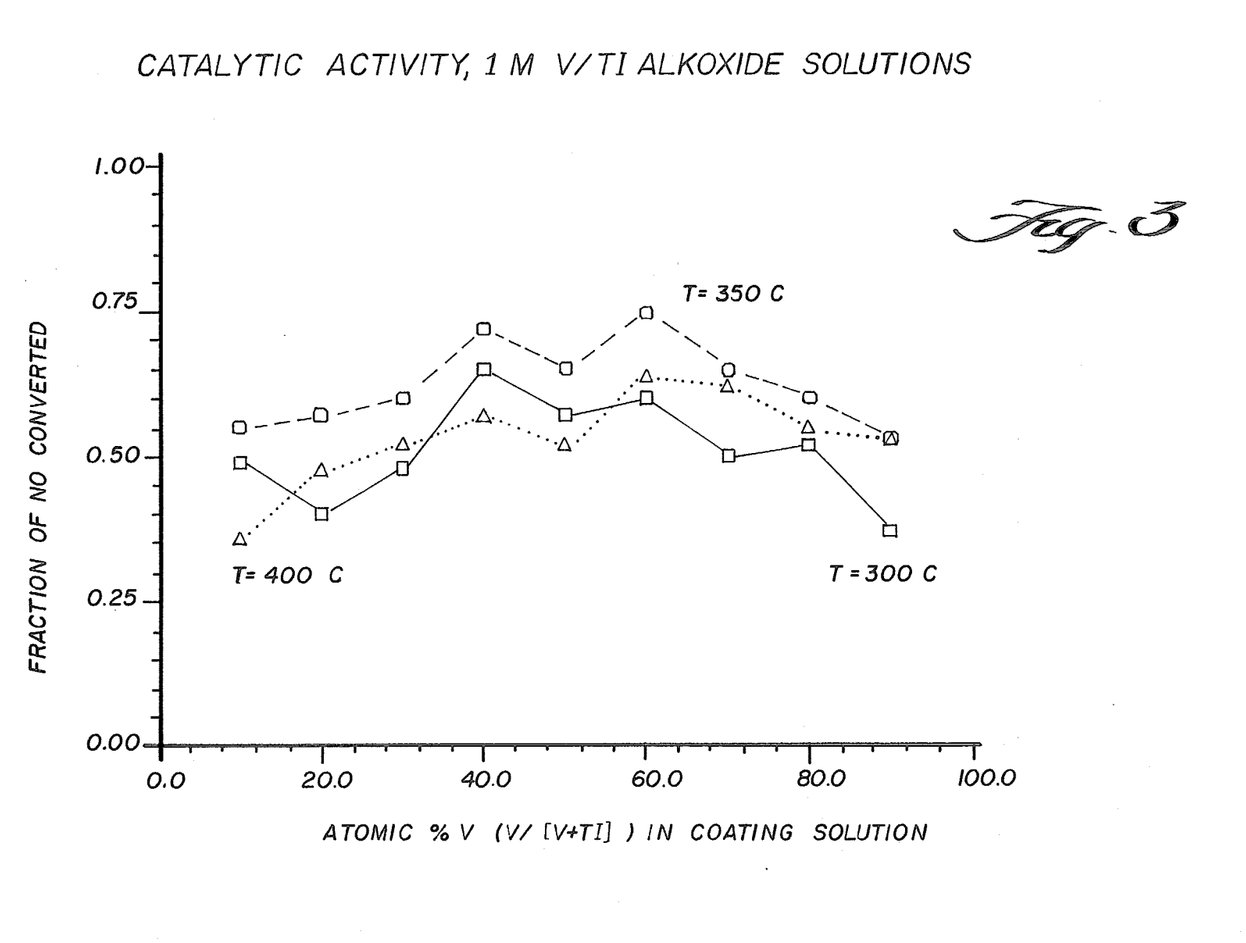
FIG. 3 illustrates the catalytic activity of vanadium oxide-titanium oxide coated fibers (in terms of fraction of nitrogen oxides converted) as a function of the atomic ratio of vanadium to titanium in the coating solution, at three different cure temperatures. This figure is described in greater detail in Example 4 below.

FIG. 3 graphically illustrates the effect of the vanadium to titanium atomic ratio on the coated cloth on the fractional conversion of nitric oxides in the flue gas at a given face velocity of 2 feet per minute at conversion (flue gas) temperature of 300° C., 350° C., and 400° C. From this, it can be seen that optimum nitrogen oxide conversion occurs in the range of between about 40 and 60 percent vanadium.

Figure 4:
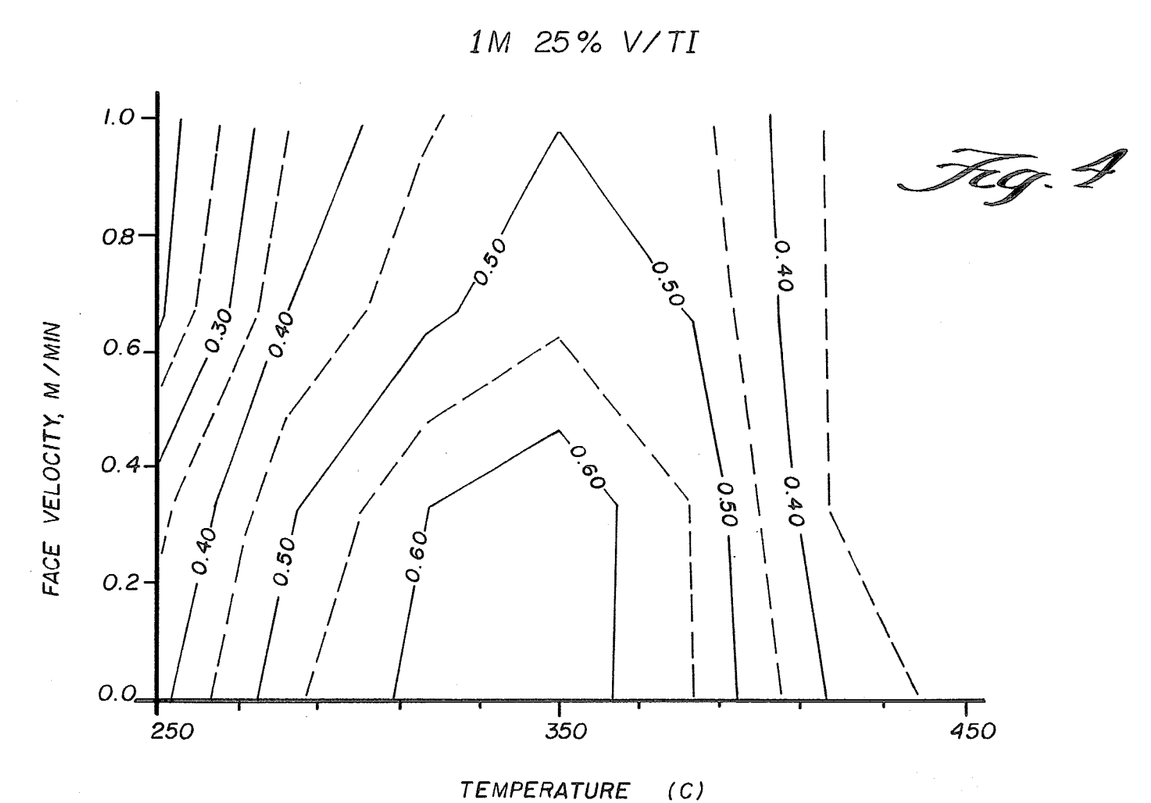
FIG. 4 illustrates the fraction of nitrogen oxides converted as a function of the face velocity of the flue gas and flue gas or conversion temperature for a glass cloth coated in accordance with the invention from a coating solution containing vanadyl and butylate and titanium i-propoxide in a molar ratio of 25:75. This is described in greater detail in Examples 4 and 6.

FIG. 4 plots fractional conversion of nitrogen oxides in the flue gas for cloth Sample B as a function of the face velocity of flue gas through the sample and the temperature of the conversion. FIG. 4 contains contour lines of constant catalytic activity, for example, the line labelled "0.50" denotes those conditions of face velocity and temperature where Sample C will convert half of the incoming nitrogen oxides. From this figure, it is apparent maximum nitrogen oxide conversion occurs at a conversion temperature of about 350° C.

EXAMPLE 5

This example demonstrates the increase in catalytic activity achieved by applying an undercoating of a highly porous high refractory oxide coating before applying the porous catalyst coating. Heat cleaned S-type glass cloth was dip coated in a one liter solution containing 0.15 moles of silicon tetraethoxide and 0.15 moles of zirconium tetrapropoxide in diacetone alcohol. The cloth was air dried one hour, and cured at 375° C. for four hours. The cloth was then dip coated in a one liter solution containing 0.125 moles of vanadyl n-butylate and 0.375 moles of titanium i-propoxide in diacetone alcohol. The cloth was again air dried for one hour, and cured at 375° C. for four hours.

Figure 5:
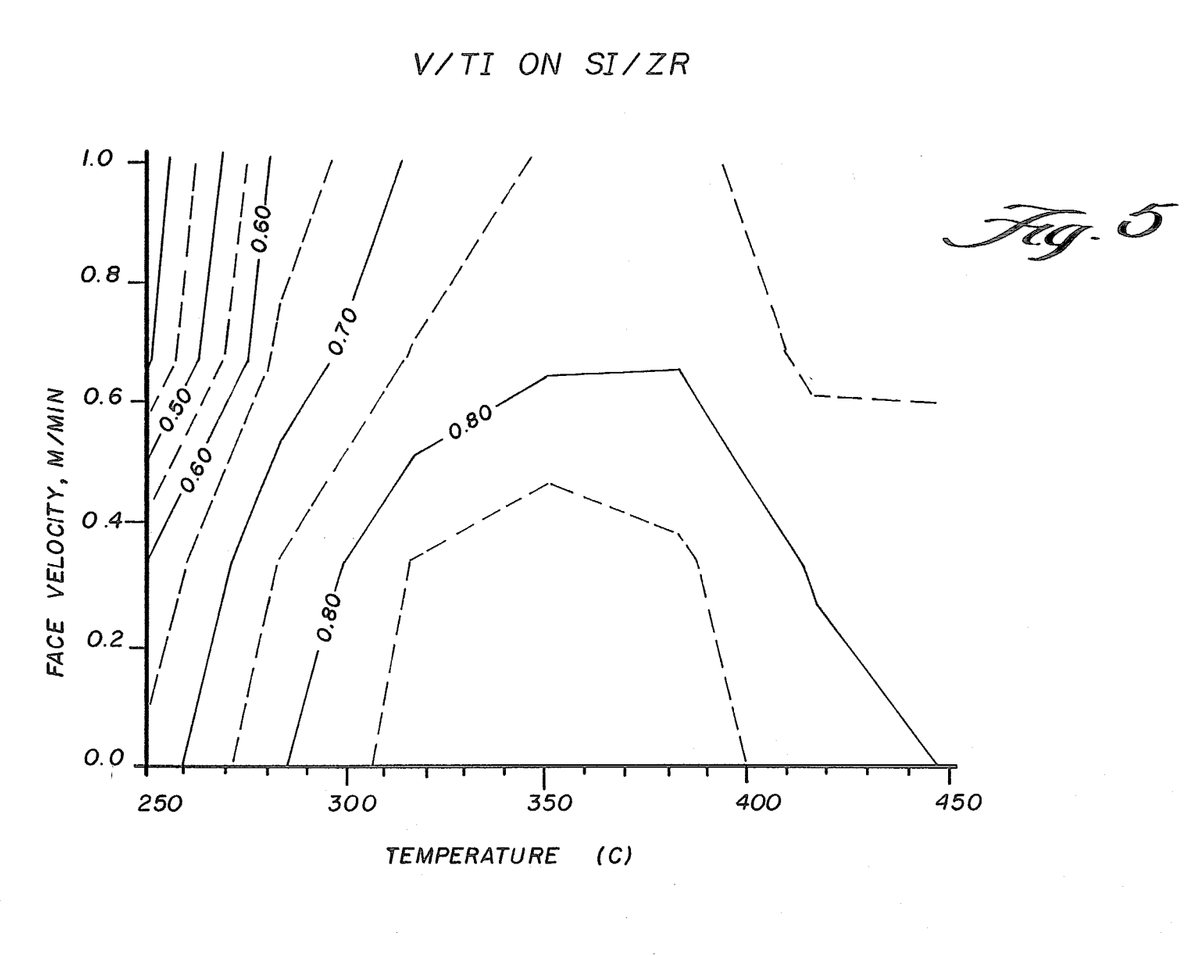
FIG. 5 illustrates the fraction of nitrogen oxide converted as a function of the face velocity and temperature of the flue gas when passed through a glass cloth having a V/Ti coating on a Si/Zr undercoating as described in further detail in Example 5.

The catalytic activity of the thus-coated cloth was tested using a reactor with a simulated flue gas mixture substantially in the same manner as described in Example 4, and the resulting activity is plotted on FIG. 5 as contour lines of constant catalytic activity, the values representing the fraction of NO converted. It is readily apparent by comparison of FIG. 5 against FIG. 4 that a substantial increase in catalytic activity has been obtained as compared to glass cloth coated with a 25% V/Ti oxide layer without the Si/Zr oxide undercoating.

EXAMPLE 6

To demonstrate the effect of curing the metal alkoxide coating first in a microwave oven and subsequently in a conventional thermal oven, heat cleaned S-type glass cloth (33 oz/yd$^2$) was dip coated in a one liter solution containing 0.25 moles of vanadyl n-butylate and 0.75 moles of titanium i-propoxide. The cloth was air dried for one hour.

Sample A was cured by heating at a 60% power level in a 700 watt microwave oven for 10 minutes and it was subsequently further cured in a conventional thermal oven at 375° C. for four hours. The catalytic activity of Sample A is shown on FIG. 6.

Sample B was cured by heating at a 60% power level in a 700 watt microwave oven for 10 minutes. The catalyst activity of this sample is shown in FIG. 7.

Sample C, after drying, was cured in a conventional thermal oven at 375° C. for four hours, without any microwave cure. The catalytic activity of Sample C is shown in FIG. 4.

Figure 6:
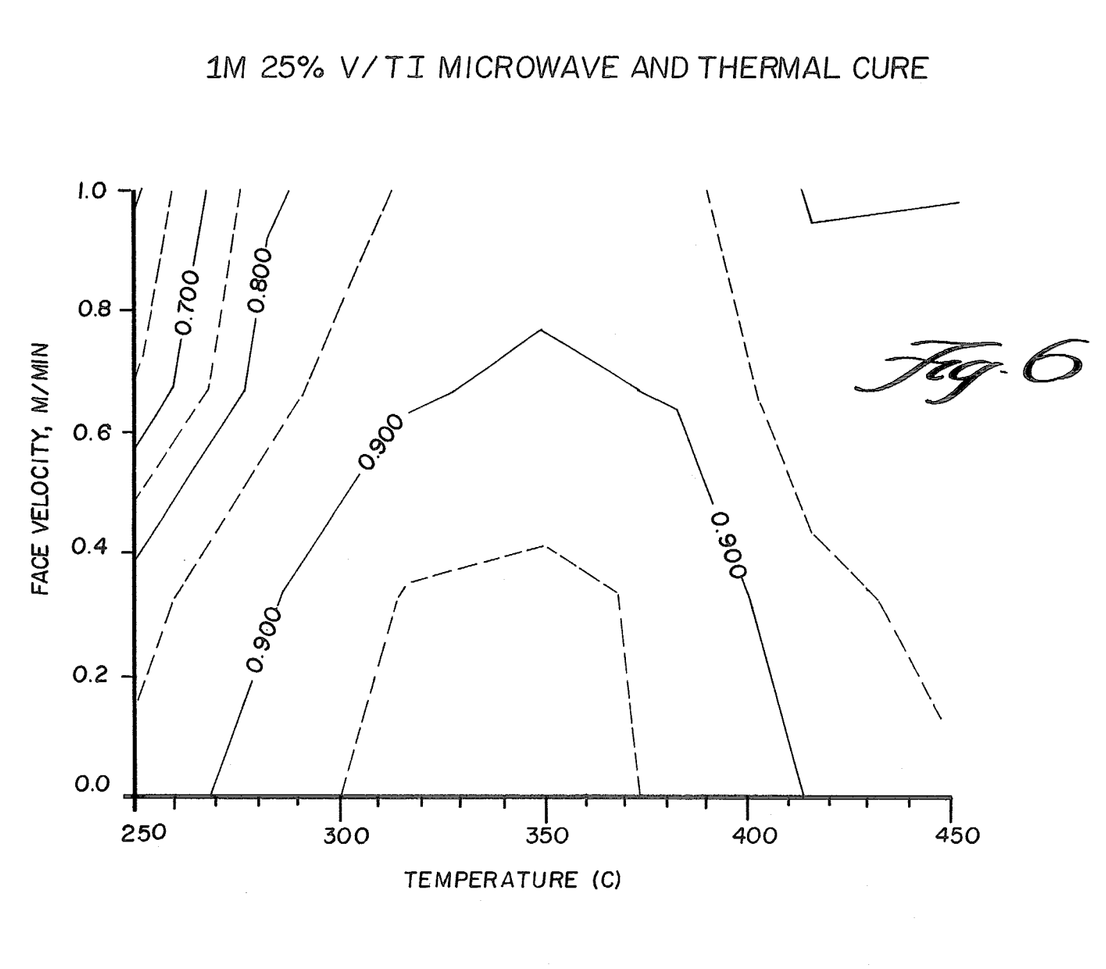
FIG. 6 illustrates the fraction of nitrogen oxides converted as a function of face velocity and temperature of a flue gas when passed through a glass cloth coated in accordance with the invention and coated first in a microwave oven and subsequently in a conventional thermal oven, as described in greater detail in Example 6.
Figure 7:
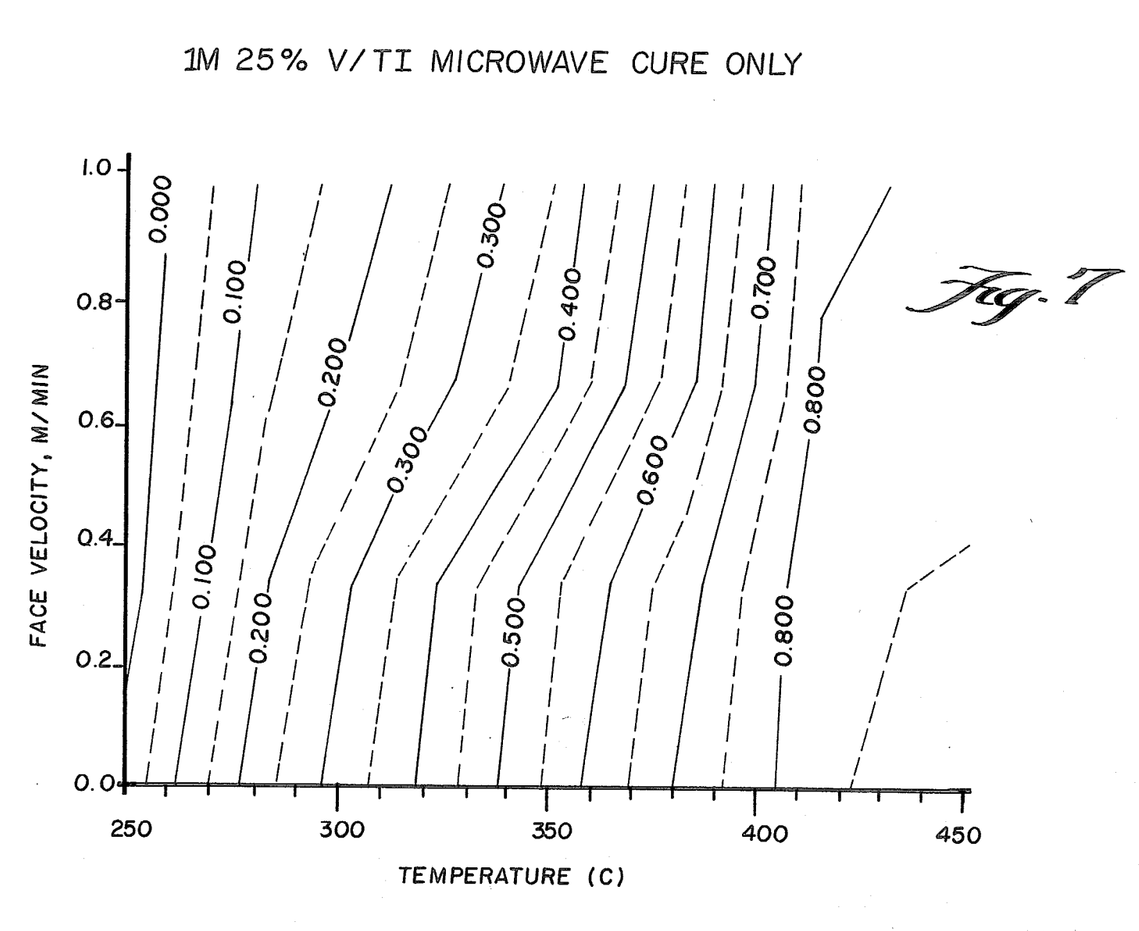
FIG. 7 illustrates the fraction of nitrogen oxides converted as a function of a face velocity and temperature of a flue gas when passed through a glass cloth coated first in a microwave oven only, as described in greater detail in Example 6.

A comparison of FIGS. 4, 6, and 7 demonstrates that a combination of microwave and thermal cure results in a significantly increased catalytic activity for catalyst cloth as compared to either a microwave cure alone or a thermal cure alone.

EXAMPLE 7

The flexibility and resistance to self-abrasion of glass cloth in the fill direction is tested by the MIT flex test in accordance with ASTM Test No. D 2176, using a 4 pound load and No. 8 spring. This is a standard test in which the sample is successively folded under controlled conditions until a tear occurs, and is designed to simulate the flexing that filter bags experience during the cleaning cycle. Tested under these conditions, heat cleaned S-type glass cloth, with no finish, failed after only 9 cycles. By way of comparison, commercially available ceramic cloth, which has attained satisfactory performance as a filter bag at 500° C., exhibits a flex life of 108 cycles to failure, and it has thus been assumed that a flex life greater than about 108 cycles is a desirable condition for a high temperature coating for filter bag use.

To evaluate the effect of coatings on flex life of glass cloths, samples of cloths were coated with various alkoxide solutions, air dried for 10 minutes and cured in a conventional thermal oven for 4 hours at 375° C. The results of the flex life test on these samples is given in the table below. S-type glass was coated with the following individual solutions:

| Sample | Cycles to Failure |
| --- | --- |
| 0.05 M Ti alkoxide solution | 11 |
| 0.1 M Ti alkoxide solution | 10 |
| 0.2 M Ti alkoxide solution | 6 |
| 0.3 M Ti alkoxide solution | 10 |
| 0.4 M Ti alkoxide solution | 5 |
| 0.5 M Ti alkoxide solution | 5 |
| 0.05 M Zr alkoxide solution | 29 |
| 0.1 M Zr alkoxide solution | 44 |
| 0.2 M Zr alkoxide solution | 39 |
| 0.3 M Zr alkoxide solution | 19 |

-continued

| Sample | Cycles to Failure |
|---|---|
| 0.4 M Zr alkoxide solution | 8 |
| 0.5 M Zr alkoxide solution | 12 |
| 0.3 M 50% Si/Zr alkoxide solution | 32 |
| 0.5 M 25% V/Ti alkoxide solution | 37 |
| 0.5 M 25% V/Ti on 0.3 M 50% Si/Zr | 28 |

This demonstrates that although some improvement in flex lifetime was achieved by applying a single layer of these coatings, none of the cloths listed on this table exhibited flex lifetimes of 108 cycles to failure.

Figure 8:
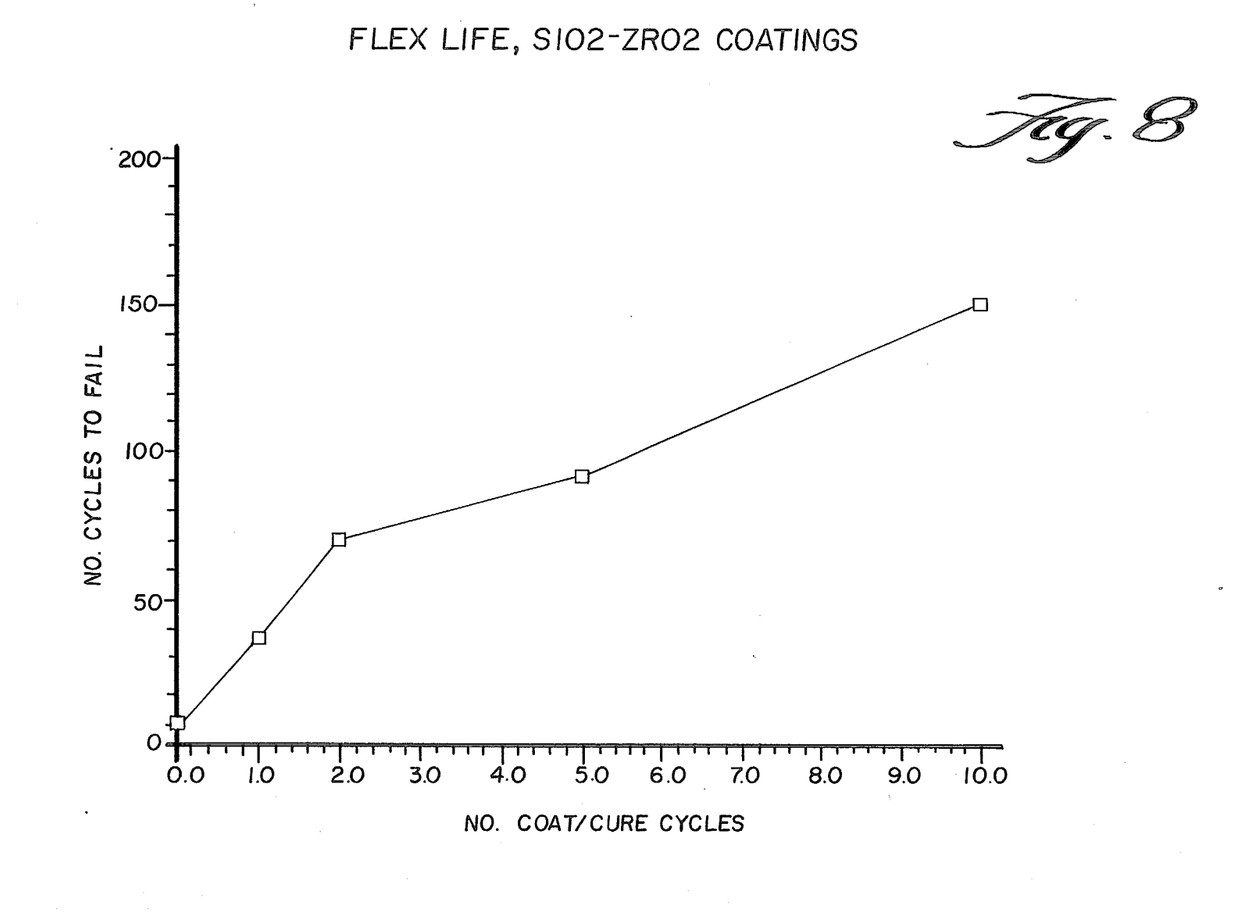
FIG. 8 illustrates the flex life of glass cloth coated with a silicon oxide-zirconium oxide coatings in terms of the number of cycles to fail as a function of the number of coat and cure cycles utilized, as described in greater detail in Example 7.

In an attempt to form more uniform coatings, cloth was successively coated with dilute (0.1M) alkoxide solutions. Between each coating step the cloth was cured at 300° C. for four hours. The cloth was subjected to a final core at 375° C. for 4 hours after the last coating was applied. The improvement in flex lifetime of S-type glass cloth coated in this manner with $SiO_2/ZrO_2$ in a Si:Zr atomic ratio of 1:1 is shown in FIG. 8. As the number of coat/cure cycles increases, flex lifetime improves considerably. It appears that ten coat/cure cycles are more than sufficient to attain a flex life exceeding that of the commercially available ceramic fiber.

EXAMPLE 8

In order to test the suitability of catalytically coated glass cloth substrate for filter bag applications, the following samples were prepared:

SAMPLE 1

A coating solution was prepared by dissolving 114.5 grams of vanadyl-n-butylate (0.4 moles of VO-$(OC_4H_9)_3$) and 170.6 grams of titanium i-propoxide (0.6 moles $Ti(OC_3H_7)_4$) in dry diacetone alcohol to make one liter of solution. The diacetone alcohol was dried by immersing molecular sieve (Linde 5A) in it overnight, and removing the sieve by filtration prior to use.

A 12 inch by 12 inch swatch of heat cleaned S-type glass cloth (33 oz/yd$^2$) was immersed in the solution for 10 seconds, removed, and allowed to air dry for 10 minutes.

The fabric was cured by heating it in a 700 watt microwave oven for 10 minutes, followed by heating the cloth in a conventional oven at 375° C. for four hours.

SAMPLE 2

A coating solution was prepared by dissolving 11.4 grams of vanadyl-n-butylate (0.04 moles of VO-$(OC_4H_9)_3$) and 17.1 grams of titanium (IV) i-propoxide (0.06 moles $Ti(O(C_3H_7)_4$) in dry diacetone alcohol to make one liter of solution. The diacetone alcohol was dried by immersing molecular sieve (Linde 5A) in it overnight, and removing the sieve by filtration prior to use.

A 12 inch by 12 inch swatch of heat cleaned S-type glass cloth (33 oz/yd$^2$) was immersed in the solution for 10 seconds, removed, and allowed to air dry for 10 minutes.

The fabric was cured by heating it in a 700 watt microwave oven for 10 minutes.

The coat-cure procedure was repeated 20 times, so that thin layers of coating were deposited in succession.

After 20 coat-cure cycles, the fabric was cured in a conventional oven for four hours at 375° C.

SAMPLE 3

Sample 3 was a test of heat cleaned S-type glass cloth with no coating.

SAMPLE 4

A silicon oxide-titanium oxide mixture precursor solution was prepared by dissolving 10.4 grams of silicon tetraethoxide (0.05 moles of $Si(OC_2H_5)_4$) and 16.4 grams of zirconium tetrapropoxide (0.05 moles of $Zr(OC_3H_7)_4$) in dry diacetone alcohol to make one liter of solution.

A vanadium oxide-titanium oxide mixture precursor solution consisting of 114.5 grams of vanadyl-n-butylate (0.4 moles of $VO(OC_4H_9)_3$) and 170.6 grams of titanium (IV) i-propoxide (0.6 moles $Ti(O(C_3H_7)_4$) in dry diacetone alcohol to make one liter of solution was prepared.

A 12 inch by 12 inch swatch of heat cleaned S-type glass cloth (33 oz/yd$^2$) was immersed in the $SiO_2/ZrO_2$ precursor solution for 10 seconds, removed, and allowed to air dry for 10 minutes.

The fabric was cured by heating it in a 700 watt microwave oven for 10 minutes. This procedure was repeated 5 times in order to build thin layers of a high surface area, abrasion resistant coating.

The swatch of S-cloth was then immersed in the vanadium oxide-titanium oxide mixture precursor solution for 10 seconds, removed, and allowed to air dry for 10 minutes.

The fabric was cured by heating it in a 700 watt microwave oven for 10 minutes, followed by heating the cloth in a conventional oven at 375° C. for four hours.

SAMPLE 5

Sample 5 is identical to Sample 2 except that a commercially available ceramic cloth was used as the support in place of S-type glass cloth.

The $NO_x$ reduction capability of the fabric samples in a bag filter application were evaluated under carefully controlled conditions that accurately simulated the actual flue gas composition that would be encountered. Fabric samples of about 0.5 ft$^2$ in size were housed in an oven which kept the samples at 650°±25° F. Flue gas was drawn through the filter sample at a face velocity of 2.0 ft/min. After the filter, the flow was split with about 10 scfh going to a sample conditioner and flue gas analyzers, and the balance of about 20 scfh going to a gas pump and dry gas meter for control of the total flow.

For these tests, ammonia was injected into the system well upstream of the sample point to insure that the ammonia was sufficiently mixed in the flue gas stream prior to sampling with a slipstream sampler. For the first part of each test, the ammonia was set to the same concentration as the measured $NO_x$ level at the start of the test, and the $NH_3/NO_x$ ratio was maintained at that level to within about ±10 percent throughout the tests. The flue gas for the test was produced in a 550,000 btu/hr pulvarized coal fired particulate test combuster, which was specifically designed to generate particulate matter representative of large scale pulvarized coal-fired boilers. The average coal feed rate was 73.8 lb/hr, and the range of combustion flue gas composition over the period of tests, measured just after the combustor, was as follows:

| Component | Concentration |
|---|---|
| Oxygen | 4.26-5.0% by volume |
| Carbon Dioxide | 14.9-15.9% by volume |
| Sulfur Dioxide | 232-291 ppm |
| Nitrogen Oxides | 899-944 ppm |

To determine the amount of $NO_x$ removed, $NO_x$ concentration in the gas downstream of the filter was measured. $NO_x$ was also measured prior to starting the ammonia injection and again at the end of the test, after the ammonia injection was shut off, in order to establish the baseline readings. In general, the $NO_x$ removal was in the range of between about 82 and 97% at face velocities of about 2 ft/min.; a face velocity of 2 would ordinarily be encountered in bag filter applications. There was no evidence of deterioration of the $NO_x$ removal with time except for Sample 5, which appeared to deteriorate somewhat during the first hour of testing. However, after the first hour, the removal appeared to steady out and no further deterioration was evident. The results of the specific test samples is reported on the following table.

| Samples | Approximate Face Velocity (ft/min) | % $NO_x$ Removal |
|---|---|---|
| 1 | 2.0 | 82.0-91.3 |
| 2 | 0.6 | 98.2-99.3 |
| 2 | 2.0 | 97.0-97.3 |
| 2 | 2.9-3.1 | 90.9-94.5 |
| 3 | 2.0 | 3.7-4.9 |
| 4 | 2.0 | 86.1-91.4 |
| 5 | 2.0 | 90.7-94.9 |

What is claimed is:

1. A method for the preparation of a catalytically active flexible fibrous element comprised of a porous, catalytically active layer of at least one metal oxide coated on, and disposed as the external surface of, a flexible fibrous substrate of substantially non-porous fibers having surface hydroxyl groups selected from the group consisting of glass and ceramic fibers, said method including the steps of
   a. preparing a coating solution of at least one substantially unhydrolyzed hydrolyzable metal alkoxide precursor of said at least one catalytically active metal oxide dissolved in a substantially anhydrous organic solvent;
   b. applying a thin, substantially uniform layer of said coating solution on a contaminant free surface of said non-porous fibrous substrate;
   c. drying said coated substrate in the presence of water or water vapor in a manner so as to initiate hydrolysis of said metal alkoxide to the corresponding metal hydroxide and condensation thereof to the corresponding metal oxide; and
   d. curing said coated substrate initially in a microwave oven and thereafter further curing in a thermal oven at a temperature in the range of between about 250° C. and about 500° C. so as to drive said hydrolysis and condensation reactions substantially to completion, and to substantially remove the organic constituents from said coated substrate and form said element, said curing being done at a temperature less than that which will cause a substantial loss of catalytic activity.

2. The method of claim 1 wherein said organic solvent is diacetone alcohol.

3. The method of claim 1 wherein said coated substrate is cured at a temperature of between about 350° and 400° C. and wherein said coating solution includes titanium tetrapropoxide and vanadyl n-butylate.

4. The method of claim 3 wherein said cure temperature is about 375° C.

5. The method of claim 1 wherein said substrate is a glass cloth substrate, and prior to being coated with said coating solution, said substrate is heat cleaned at a temperature of at least about 250° C. to remove surface contaminants.

6. The method of claim 1 wherein the molar concentration of said precursor is at least 0.1 molar.

7. The method of claim 6 wherein said coating solution contains alkoxides of silicon and zirconium 8. The method of claim 7 wherein the molar concentration is at least 0.25.

9. The method of claim 1 wherein step c further includes at least partially curing said coated substrate and further wherein step b and said step c are sequentially repeated by applying solution to a prior formed layer.

10. The method of claim 9 wherein step b and said step c are sequentially repeated so as to form at least ten layers on said flexible fiber substrate.

11. The method of claim 9 wherein the initial step b applies a coating solution containing alkoxides of silicon and zirconium in a silicon to zirconium atomic ratio of between about 1:9 to about 9:1.

12. The method of claim 11 wherein final step b is practiced by applying a coating solution containing alkoxides of vanadium and titanium in a vanadium to titanium atomic ratio of between about 1:9 to about 9:1 onto the underlayer.

13. The method of claim 1 wherein said coating solution contains a vanadium mixture of and titanium alkoxides in which the atomic % vanadium is between 40% to 60%.

14. The process of claim 1 wherein said layer has a thickness of 0.02-0.08 mils.

15. The process of claim 1 wherein the flexible fibrous substrate is in the form of a filter bag.

* * * * *